United States Patent

Barron

[15] 3,675,352
[45] July 11, 1972

[54] SONAR RANGE PREDICTION AND TACTICAL COMPUTER

[72] Inventor: Daniel Barron, 9326 Edmonston Road, Greenbelt, Md. 20770

[22] Filed: Sept. 18, 1970

[21] Appl. No.: 73,321

[52] U.S. Cl. ................................ 40/31, 40/86, 116/124
[51] Int. Cl. ........................................... G09f 11/18
[58] Field of Search ............ 40/86, 31; 33/1 SD, 1 SB, 1 M; 35/76, 31 A, 35 G, 28; 116/124, 135

[56] References Cited

UNITED STATES PATENTS

| | | | |
|---|---|---|---|
| 3,456,352 | 7/1969 | Bowen | 33/1 M X |
| 3,067,931 | 12/1962 | Mosse | 35/76 X |
| 2,999,315 | 9/1961 | Benson | 31/1 M |
| 3,003,270 | 10/1961 | Palm | 40/86 |
| 2,188,210 | 1/1940 | Smith | 40/31 |
| 1,821,844 | 9/1931 | McGrath | 40/31 |

*Primary Examiner*—Robert W. Michell
*Assistant Examiner*—Richard Carter
*Attorney*—R. S. Sciascia, Arthur L. Branning, J. G. Murray and M. L. Crane

[57] ABSTRACT

This disclosure is directed to a device for aiding a sonar operator in determining range to a target and then to utilize this information for determining optimum parameters for utilization of a particular tactic. The device includes environmental and equipment related information which is presented for ready observation though hand or mechanical operation of the device.

3 Claims, 5 Drawing Figures

PATENTED JUL 11 1972 3,675,352
SHEET 1 OF 2
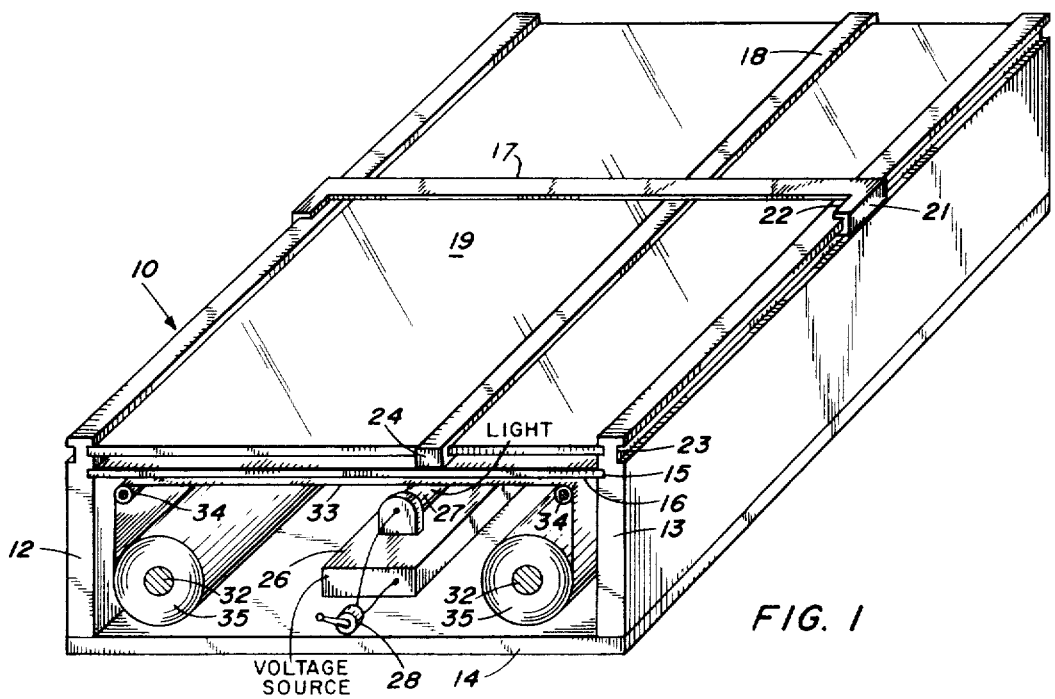
FIG. 1
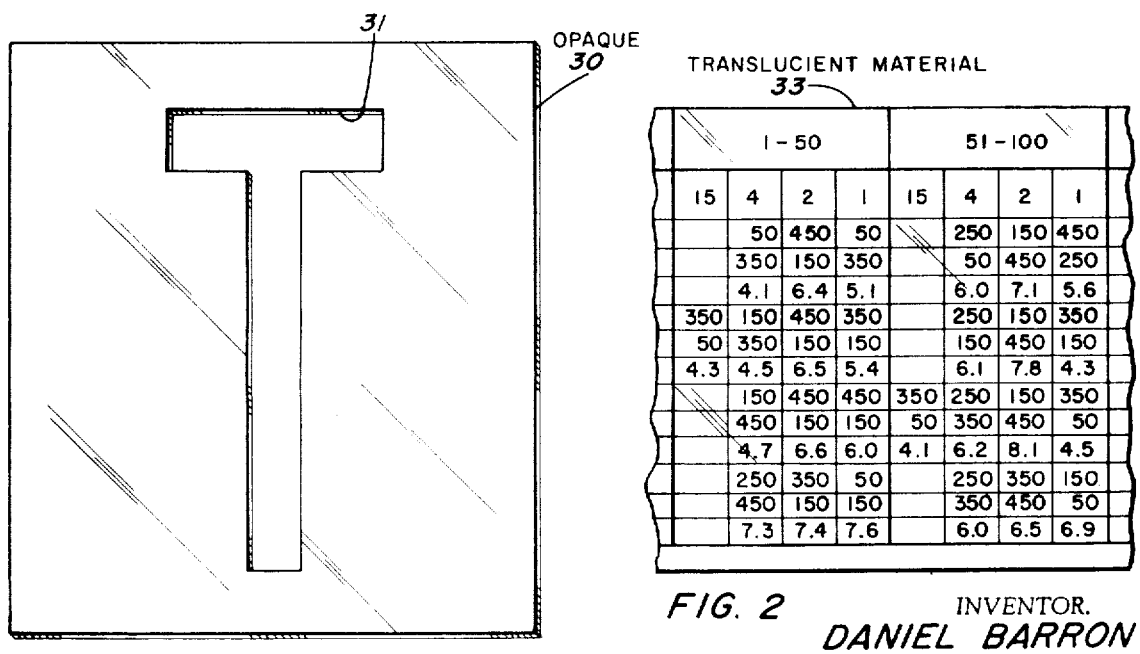
FIG. 3
FIG. 2
INVENTOR.
DANIEL BARRON
BY
AGENT
ATTORNEY

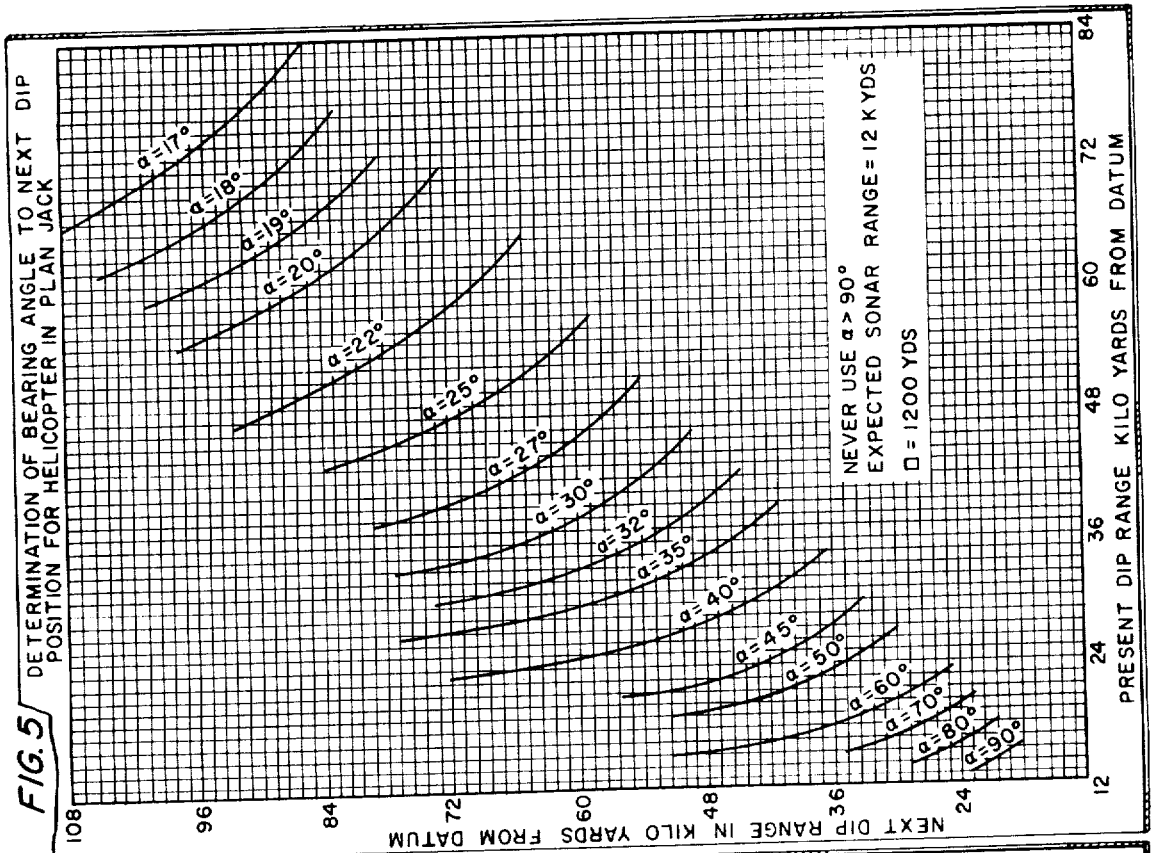
FIG. 5 DETERMINATION OF BEARING ANGLE TO NEXT DIP POSITION FOR HELICOPTER IN PLAN JACK
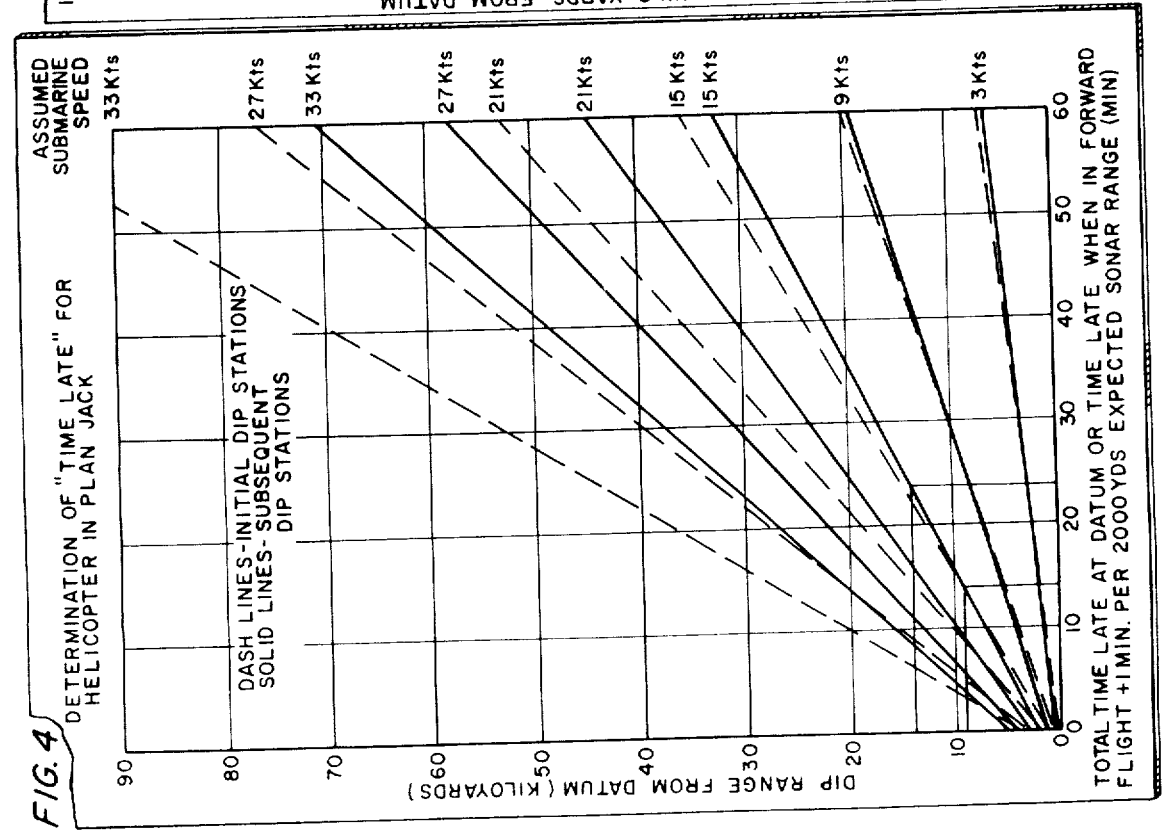
FIG. 4 DETERMINATION OF "TIME LATE" FOR HELICOPTER IN PLAN JACK

SONAR RANGE PREDICTION AND TACTICAL COMPUTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Heretofore, sonar operators were required to make range computations by the use of prepared tables, diagrams, and large handbooks with the aid of large electronic calculators. These range values were then processed by complex tactical computers to determine the optimum bearing and range for "-kill" or search of the target.

SUMMARY OF THE INVENTION

The device of this invention makes use of a lighted display unit which includes therein a scroll of translucent material containing thereon environmental information, sonar range, and tactical data. The scroll may be rotated to present the desired information by hand operation or by mechanical operation by use of a motor device. The scroll is rotated until the desired environmental information appears in the window, i.e., bathythemograph, wave height, and meteorological data, range conversion data, or tactical information in order to use this information for determining bearing, range or any other data necessary to locate a target. Some information may be included on separate inserts which may be inserted as desired.

STATEMENT OF THE OBJECTS

It is therefore an object of the present invention to provide a sonar range prediction and tactical computer which is usable by an operator to avoid use of several different data tables, books, etc.

Another object is to provide a simply operated device for determining different parameters to predict range of a target.

Still another object is to provide a device by which one predicts range of a target by use of a single unit.

Yet another object is to provide a device for determining range which requires less operator attention than normally used.

BRIEF DESCRIPTION OF THE DRAWING

FIG. 1 is a perspective view of the device with one end cut away for illustrating the various parts thereof.

FIG. 2 illustrates a scroll used in the device with a portion of the information in view.

FIG. 3 is a template insert which may be used as an aide in obtaining information from the scroll of FIG. 2.

FIG. 4 illustrates an insert including a graphic determination of "time" for a helicopter flight from a datum point.

FIG. 5 illustrates an insert including a graphic determination of bearing angle to next dip position for a helicopter in a planned attack.

DESCRIPTION OF THE INVENTION

Nor referring to the drawings, there is shown by way of example a device for carrying out this invention. The device is formed by a box-like housing 10 which may be formed of plastic, Plexiglass or any other suitable material into a square or rectangular shape. The housing includes sides 12 and 13 and a fixed bottom 14. Sides 12 and 13 extend upwardly and includes slots 15 on the inner surface. The slots are sufficiently wide that a slide 16 with desired information thereon may be positioned relative to the housing. Cursors 17 and 18 are placed above the slide perpendicular to each other and movable with respect to the slide 16. The cursors are secured for movement by any suitable means such as along rods secured to the sides or along an upper plate 19 as shown. As shown, cursor 17 is provided with ends 21 that extend over the edge of the sides and have a runner 22 that rides within slots 23. Cursor 18 may be provided with slotted ends 24 that fit over the upper plate 19 along which it is movable.

The box is provided with a voltage source such as batteries 26 which are secured to the bottom to provide a voltage source for a light 27 which is controlled by a switch 28 that is secured to one side of the box. Rollers 31 and 32 are provided at each end of the inner confines of the box upon which a transparent scroll 33 of translucent material is mounted for feeding from one roller onto the other. The scroll information is fed up over small rollers 34 that hold the scroll information near the upper end of the housing for viewing. A knob 35 is secured to one end or both ends of each roller for the purpose of feeding the scroll from one roller onto the other roller. The rollers are shown for hand operation; however, the rollers could be provided with a mechanical drive through which the mechanical means could be controlled for rotation of the scroll. The scroll may be made of transluscent Mylar material for strength and legibility.

The scroll is provided with information pertaining to depth, the gradient for different depths, different oceanographic parameters for various types of sonar equipment and range conversion data depending on environmental factors which are obtained by the sonar operator.

The slides or inserts positioned above the scroll information contains thereon different sonar and tactical information from which specific data or information may be obtained by manipulation of the cursors according to different parameters such as distance, speed, and depth of target and speed of helicopter or ship detecting the target.

The light is positioned below the scroll so that an operator may view the information on the scroll without the light source being exposed to others. The light source as set forth could be replaced with any other light producing means for lighting the scroll.

The information included on the scroll may be any information necessary to determine range, bearing, etc. The scroll is rotated until the desired information appears in the window. As shown, the scroll has thereon different sections of horizontal and vertical numerical values. Each vertical section is headed on a horizontal line with values for layer depth such as 0 ft., 1 ft.–50 ft., 51–100 ft., etc. wherein the values increase by 50 ft. for each section. The next horizontal line is the gradient in degrees Fahrenheit per 100 ft., such as 1, 2, 4, and 15. Vertically under each gradient there is shown separate groups of depth values and a range value for each group. Each group is for different base thermocline depths. The upper value is the first depth at which the transducer will be dropped to see if the target can be detected. The second value is the second depth at which the transducer is to be dropped for detection of a target. The range value is the range at which a target may be detected for the two different depths and with the particular base thermocline depth. The templet 30 shown in FIG. 3 is inserted above the scroll for guide purposes and for aiding in obtaining the correct data by viewing the scroll through the T-shaped opening. Therefore, the large numbers 50, 150, 350 etc. are depths at which the transducer is dropped and the small numbers 4, 1, 4.5, 5.1, 5.4, etc. are ranges in 1,000 yds. for detection of targets below the layer for different gradients and for transducers dropped to the depths shown in the vertical columns immediately above the range numbers given. Other information such as tactical charts may be contained on the scroll or made as separate inserts which are slid into the slots on the scroll housing. The inserts could include tactical and sonar conditions and the cursors would be used in conjunction with the inserts to more accurately determine angle of flight, direction, etc.

In use of the device for carrying out a search and attack on an underwater target by use of a helicopter, the helicopter is flown out to the suspect area. The environmental, bathythermograph, wave height and meteorological data is obtained for the specific equipment used. Once the environmental data is obtained, the required sonar range conversion may be made by rotating the scroll which includes helicopter range charts. The range charts are advanced until the correct layer depth section is visible to the operator. The correct range conversion data is obtained by observing the proper gradient column and selecting the range value in accordance with the transducer depth information. The template may be used as an aid in obtaining the correct data from the scroll. The range conversion data is then used in conjunction with the tactical charts which may be included on the scroll or on separate inserts as shown in FIGS. 4 and 5. The cursors secured to the scroll housing are manipulated in accordance with the information previously obtained in order to accurately determine the direction, angle,etc. that the helicopter should fly in order to attack the underwater object.

It is obvious that all environmental data, range conversion data, tactical charts etc. may be included on a single scroll if desired or environmental data, and range conversion information may be included on the scroll, with tactical information on inserts. If desired, several devices including scrolls therein may be positioned side by side with separate information on different scrolls such that the information may be seen more readily. In use of several devices, each separate scroll would require less rotation to position the desired information in a position for viewing since there would be less numbers of different types of information on each scroll.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A device for aiding in the determination of sonar range and tactical bearing to an underwater target; which comprises,
   a housing,
   a scroll formed of a translucent material movable within said housing,
   a series of different data printed onto said scroll, said data dependent on different environmental conditions, for different types of sonar equipment,
   means for movement of said scroll for presenting desired portions of said data on said scroll for observation by an operator,
   a slide including desired sonar information inserted into said housing above said scroll,
   cursor means associated with said scroll and said slide to aid in determining desired information,
   said cursor including perpendicular slides movable relative to each other along the upper edges of said housing across said scroll and said slide, and
   an illuminating means positioned relative to said scroll for exposing information contained on said scroll and said slide.

2. A device as claimed in claim 1; which includes,
   hand means for feeding said scroll to expose information thereon for observation by an operator.

3. A device as claimed in claim 1; which includes,
   mechanically operated means for feeding said scroll to expose information thereon for observation by an operator.

* * * * *